May 25, 1926.

G. BOYCE

WAFFLE IRON ATTACHMENT

Filed Dec. 21, 1925

1,586,402

Inventor,

Girard Boyce,

By

Attorney

Patented May 25, 1926.

1,586,402

UNITED STATES PATENT OFFICE.

GIRARD BOYCE, OF WASHINGTON, DISTRICT OF COLUMBIA, ASSIGNOR TO NATIONAL AUTOMETER RESTAURANT CORPORATION, OF WASHINGTON, DISTRICT OF COLUMBIA, AND NEW YORK, N. Y.

WAFFLE-IRON ATTACHMENT.

Application filed December 21, 1925. Serial No. 76,724.

My invention relates to improvements in waffle iron attachments, and the main object of my invention is the provision of an attachment or appliance which will serve to retain a plate in position upon the waffle iron to effect the heating of the plate directly from the heat of the waffle iron and thus dispense entirely with outside plate heating means.

Another object of my invention is the provision of a device which can be applied to waffle irons in use or at the time of manufacture at a very small cost and which will operate effectively and practically in the heating of the plate during the cooking of the waffle.

Another object of my invention is the provision of a device which can be applied or removed with ease, which will permit instant insertion or removal of the plate and which will retain the plate in proper relation to the iron to obtain the best possible results.

Another object of my invention is the provision of an attachment of the simplest and cheapest possible construction which will greatly add to the desirability of the waffle iron by reason of dispensing with plate heating devices and insuring a practical and thoroughly efficient attachment.

To attain the desired objects my invention consists broadly in the combination with a waffle iron of an attachment for holding a plate in close relation to the iron to utilize the heat from the iron for heating the plate.

The invention further consists of a plate holding attachment for waffle irons embodying novel features of construction and combination of parts substantially as shown, described and claimed herein.

In order that the construction in detail and the operation and advantages of my attachment may be understood and appreciated I invite attention to the accompanying drawings, in which.

Figure 1:
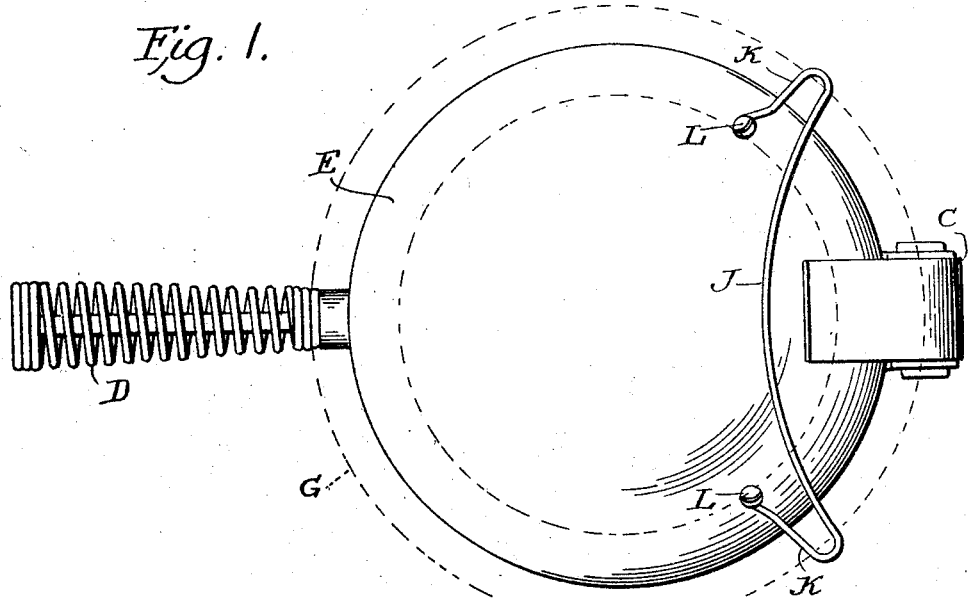
Figure 1 represents a plan view of a waffle iron provided with my attachment showing a plate in dotted lines held in position for heating.
Figure 2:
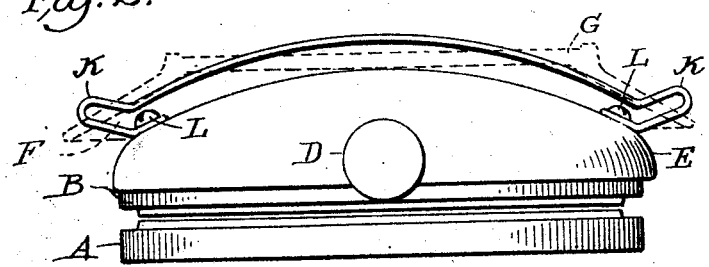
Figure 2 represents a front view with the plate shown in dotted line.
Figure 3:
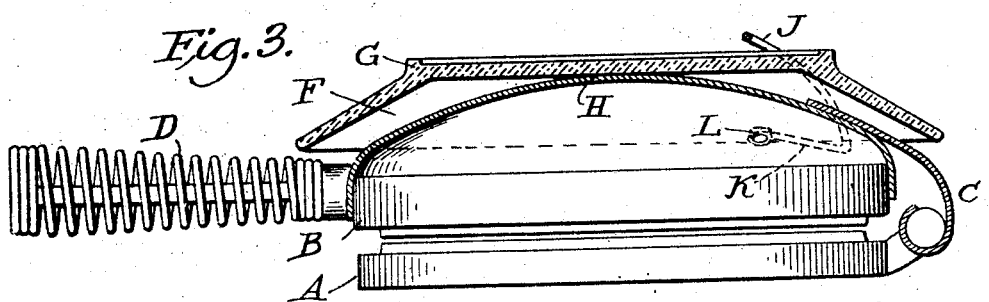
Figure 3 represents a vertical central sectional view of the waffle iron and plate in secured position.

My invention is particularly adapted for use in connection with electrically heated waffle irons, although it may be used in any situation where it will operate in a practical manner and in the drawings the letter A designates the lower section and B designates the upper section of the waffle iron, hinged together at C and the upper section carrying a handle or grasping portion D, while the upper wall E of the upper section is preferably curved, to cause said section to fit within the open portion F, of the plate G, and bear at H against said plate and in which position the plate is securely retained by the spring loop or bail J, whose arms K, are secured at L to the waffle iron, the spring loop thus acting after the manner of a holder and clamp to receive and retain the plate in close relation to the upper member of the waffle iron to utilize the heat therefrom for the purpose of heating said plate.

The manner of using my device or attachment is so obviously apparent from the drawing and description that explanation is deemed unnecessary and the plate is slipped in place under the holder or clamp and is reliably retained in place to receive the heat from the waffle iron and thus dispenses with other plate heating means and supplies at a very small cost an attachment directly to the waffle iron which does not hinder the operation of the iron while greatly increasing its value and usefulness.

I claim:

1. In combination with a waffle iron, a spring loop or bale secured to said waffle iron and forming a holder and clamp to retain a plate in position upon the iron to receive the heat therefrom.

2. In combination with the waffle iron consisting of an upper and lower hinged section, said upper section having an upper curved wall, a plate holder secured to said upper curved wall and arranged to secure a plate in position between the holder and upper curved wall of the waffle iron.

3. In combination with a waffle iron of means for securing a plate to receive the heat from the waffle iron during the cooking operation said means consisting of a plate holding member carried by the upper hinged section of the waffle iron and holding the plate against said section.

In testimony whereof I hereunto affix my signature.

GIRARD BOYCE.